United States Patent [19]

Ninomiya et al.

[11] Patent Number: 5,718,868
[45] Date of Patent: Feb. 17, 1998

[54] LEAD-FREE TIN-ZINC-BASED SOLDERING ALLOY

[75] Inventors: Ryuji Ninomiya; Junichi Matsunaga, both of Ageo, Japan

[73] Assignee: Mitsui Mining & Smelting Co., Ltd., Tokyo, Japan

[21] Appl. No.: 688,625

[22] Filed: Jul. 30, 1996

[30] Foreign Application Priority Data

Nov. 30, 1995 [JP] Japan .................................. 7-335986

[51] Int. Cl.$^6$ .................................................. C22C 13/00
[52] U.S. Cl. .................................................. 420/560; 420/561
[58] Field of Search .................................. 420/560, 561; 228/56.3

[56] References Cited

U.S. PATENT DOCUMENTS 5,491,035  2/1996  Carey, II et al. ...................... 428/647

FOREIGN PATENT DOCUMENTS 52-20181  6/1977  Japan .
59-41430  3/1984  Japan .
59-96238  6/1984  Japan .

*Primary Examiner*—Sikyin Ip
*Attorney, Agent, or Firm*—Flynn, Thiel, Boutell & Tanis, P.C.

[57] ABSTRACT

Described is a lead-free tin-zinc-based soldering alloy made up of 7 to 9 wt. % of Zn and 0.1 to 0.5 wt. % of Cu or which further contains not more than 3 wt. % of Bi and, in either case, the balance being Sn except for inevitable impurities. The present invention has made it possible to provide a lead-free soldering alloy which has mechanical properties, such as tensile strength and elongation, comparable with those of conventional Pb—Sn soldering alloys without adding thereto lead which causes environmental pollution, has a melting point not higher than 200° C., which is lower than the heat-resistant temperature of an IC package, and has a low cost.

8 Claims, No Drawings ly known. Lead,
LEAD-FREE TIN-ZINC-BASED SOLDERING ALLOY

BACKGROUND OF THE INVENTION

1. Field of the Invention

This invention relates to a lead-free tin-zinc-based soldering alloy which has a mechanical strength comparable to that of a lead-tin soldering alloy, a low melting point and does not contain lead, which is harmful to humans.

2. Description of the Prior Art

As typical soldering alloys, alloys having a Pb—Sn eutectic composition are conventionally known. Lead, which is contained in Pb—Sn soldering alloys, is, however, harmful to humans. There is accordingly a demand for a lead-free soldering alloy from the viewpoint of recent environmental problems and the like. With the foregoing in mind, various lead-free soldering alloys are proposed in, for example, the Journal of Electronic Materials, 23(8),1994 and the like. The present inventors have already filed patent applications for an Sn—Ag-based alloy in Japanese Patent Application No. 7-56691 and for an Sn—Zn-based alloy in Japanese Patent Application No. 6-172091, Japanese Patent Application No. 6-290362 and Japanese Patent Application No. 7-192483.

In order to provide a conventional Sn—Ag-based type soldering alloy with a mechanical strength comparable to that of alloys having a Pb—Sn eutectic composition, however, it is necessary to add expensive In. The conventional soldering alloy is therefore accompanied with the problems that the addition of In not only raises the cost of the alloy itself, but also increases the alloy's melting point to 210° C., which is relatively high for a soldering alloy, so that there is a potential danger that an IC package or the like to be soldered may be damaged at such a high temperature. The Sn—Ag-based soldering alloys disclosed in Japanese Patent Application No. 6-172091 and Japanese Patent Application No. 7-192483 also have the problem similar to the above alloy, they are expensive due to the expensive In contained therein. On the other hand, the soldering alloy disclosed in Japanese Patent Application No. 6-290362 is employed for a heat exchanger so that it is only required to have a resistance to thermal stress at the junction of a plate material with a tubular material and permit the prevention of the dezincification of brass. Although it is inexpensive so as to be suitable for use in a large amount, no specification is made to limit the melting point within a specific range because there is no necessity of considering the heat resistance of an IC package, or the like, which is a material that is particularly sensitive to heat.

SUMMARY OF THE INVENTION

An object of the present invention is to provide a lead-free soldering alloy, lead being a harmful substance to humans and thereby causing an environmental problem, having an excellent mechanical strength,—such as tensile strength and elongation,—comparable with that of conventional Pb—Sn-based soldering alloys, without adding thereto expensive In, a melting point also comparable with that of the Pb—Sn-based soldering alloys, described more practically, a melting point not higher than 200° C., at which there is no potential danger of damaging an IC package and the like upon soldering, and is inexpensive.

There is thus provided a lead-free tin-zinc-based soldering alloy comprising 7–9 wt. % of Zn, 0.1–0.5 wt. % of Cu and Sn as the balance except for inevitable impurities. There is also provided a lead-free tin-zinc-based soldering alloy, which comprises not more than 3 wt. % of Bi in addition to the above composition.

The present invention has made it possible to provide a lead-free tin-zinc-based soldering alloy which has mechanical properties, such as tensile strength and elongation, comparable with conventional Pb—Sn-based soldering alloys without adding lead thereto, which causes environmental pollution, has a melting point not higher than 200° C., which is lower than the heat-resistant temperature of an IC package, and has a low cost.

DESCRIPTION OF THE PREFERRED EMBODIMENTS

The present invention relates to an Sn—Zn—Cu alloy and an Sn—Zn—Cu—Bi alloy, each having Sn as a base metal. In these alloys according to the present invention, Zn improves the mechanical strength, particularly tensile strength, of the alloy and, in addition, lowers the alloy's melting point. To attain these effects, zinc is added in an amount of 7 to 9 wt. %. When the Zn content is lower than 7 wt. %, the melting point (liquidus temperature) of the alloy exceeds 200° C. When the Zn content is higher than 9 wt. %, on the other hand, the melting point exceeds 200° C. It is therefore necessary to limit the Zn content within a range of from 7 wt. % to 9 wt. % in order to control the melting point (liquidus temperature) not higher than 200° C.

In the soldering alloy according to the present invention, the addition of Cu also improves the mechanical strength, particularly tensile strength, and reduces the melting point. To obtain these effects, Cu is added in an amount of 0.1 to 0.5 wt. %. When the content of Cu is lower than 0.1 wt. %, the melting point (solidus temperature) becomes 199° C. When the Cu content exceeds 0.5 wt. %, on the other hand, the liquidus temperature exceeds 200° C.

In the soldering alloy according to the present invention, Bi improves the creep strength of the alloy. To attain such effects, it is added in an amount not greater than 3 wt. %. When the Bi content exceeds 3 wt %, the elongation becomes less than 20%, which deteriorates the reliability of a soldered junction.

Each of the soldering alloys according to the present invention has a melting point suppressed at not higher than 200° C. within the above composition range. Even at such a low melting point, it has an excellent mechanical strength, described specifically, a tensile strength of 4.0 kgf/mm² or higher and an elongation of 20% or more. Among the soldering alloys obtained according to the present invention, the alloy having an Sn-8.0Zn-0.2Cu composition shows the minimum melting point, that is, 194° C.

The present invention will hereinafter be described by the Examples.

EXAMPLES

In each Example, Sn, Zn, Cu and Bi were weighed to give a total weight of about 5 kg and to have a composition as shown in the composition list in table 1. Each composition was charged in a graphite crucible and fused in an electric furnace. The solidification starting temperature of each alloy was indicated as a liquidus temperature, while the fusion starting temperature was indicated as a solidus temperature. They were measured using a thermocouple.

Concerning tensile strength, elongation and creep life, Sn, Zn, Cu and Bi were weighed to have a chemical compositions shown in Tables 1 and 2 and to give a total weight of about 10 kg. Each composition was charged into a graphite crucible and fused in an electric furnace in the air. The fusion was conducted at 300° C. After each composition was fused completely, thorough stirring was conducted to remove gravity segregation. The reaction mixture was then cast in a mold having an internal dimension of 150×60×150 mm (height) and a cast mold thickness of 10 mm. A JIS No.4 test piece was collected from the lower part of the so-obtained cast by mechanical processing. In accordance with a testing method specified in JIS Z2241, tensile strength and elongation were measured. The results are shown in Table 1. The creep life was expressed by a creep rupture time when tested under the conditions of 100° C. and 0.7 kgf/mm$^2$. Incidentally, a Pb—Sn eutectic soldering alloy was tested in a similar manner and the results are also shown in Tables 1 and 2 collectively.

TABLE 1

| Chemical composition (wt. %) | | | Melting point (°C.) | | Tensile strength | Elongation |
| --- | --- | --- | --- | --- | --- | --- |
| Zn | Cu | Sn | Liquidus temperature | Solidus temperature | (kgf/mm$^2$) | (%) |
| 7.0 | 0.1 | Balance | 199 | 194 | 4.1 | 36 |
| 7.0 | 0.5 | Balance | 198 | 194 | 4.5 | 33 |
| 9.0 | 0.1 | Balance | 195 | 194 | 4.5 | 32 |
| 9.0 | 0.5 | Balance | 196 | 194 | 4.9 | 29 |
| 8.0 | 0.2 | Balance | 194 | 194 | 4.4 | 33 |
| 7.0 | 0 | Balance | 202 | 199 | 4.0 | 37 |
| 9.0 | 0 | Balance | 200 | 199 | 4.5 | 33 |
| 7.0 | 0.6 | Balance | 201 | 194 | 4.5 | 32 |
| 9.0 | 0.6 | Balance | 200 | 194 | 5.0 | 28 |
| Sn-37Pb eutectic | | | 183 | 183 | 4.6 | 35 |

TABLE 2

| Chemical composition (wt. %) | | | | Tensile strength | Elongation | Creep life |
| --- | --- | --- | --- | --- | --- | --- |
| Zn | Cu | Bi | Sn | (kgf/mm$^2$) | (%) | (Hr) |
| 8.0 | 0.2 | 0 | Balance | 4.4 | 33 | 55.6 |
| 8.0 | 0.2 | 1.0 | Balance | 4.8 | 30 | |
| 8.0 | 0.2 | 2.0 | Balance | 5.3 | 26 | 177.9 |
| 8.0 | 0.2 | 3.0 | Balance | 5.7 | 22 | |
| 8.0 | 0.2 | 4.0 | Balance | 6.1 | 19 | |
| Sn-37Pb eutectic | | | | 4.6 | 35 | 4.5 |

From Table 1, it has been found that the soldering alloy having a composition within a range of the present invention has a mechanical strength and elongation comparable with those of an Sn—Pb eutectic soldering alloy, and has a melting point (liquidus temperature, solidus temperature) not higher than 200° C., which is lower than the heat-resistant temperature of an IC package, thereby preventing damage upon soldering.

From Table 2, it has been found that the Bi-added soldering alloy of the present invention has a creep life of 177 hours and therefore exhibits excellent creep characteristics.

What is claimed is:

1. A lead-free tin-zinc-based soldering alloy consisting essentially of 7 to 9 wt. % of Zn, 0.1 to 0.5 wt. of Cu, 2 to 3 wt. % of Bi and the balance being Sn.

2. The alloy of claim 1, consisting essentially of 8 wt. % Zn, 0.2 wt. % Cu, 2.0 wt. % Bi and the balance being Sn.

3. The alloy of claim 1, consisting essentially of 8 wt. % Zn, 0.2 wt. % Cu, 3.0 wt. % Bi and the balance being Sn.

4. The alloy of claim 1, wherein said alloy has a melting point no higher than 200° C., a tensile strength of at least 4.0 kgf/mm$^2$ and an elongation of at least 20%.

5. A lead-free tin-zinc-based soldering alloy consisting of 7–9 wt. % Zn, 0.1–0.5 wt. % Cu, 2–3 wt. % Bi and the balance being Sn.

6. The alloy of claim 5, consisting of 8 wt. % Zn, 0.2 wt. % Cu, 2.0 wt. % Bi and the balance being Sn.

7. The alloy of claim 5, consisting of 8 wt. % Zn, 0.2 wt. % Cu, 3.0 wt. % Bi and the balance being Sn.

8. The alloy of claim 5, wherein said alloy has a melting point no higher than 200° C., a tensile strength of at least 4.0 kgf/mm$^2$ and an elongation of at least 20%.

* * * * *